United States Patent
Krajci et al.

(10) Patent No.: US 12,222,956 B2
(45) Date of Patent: Feb. 11, 2025

(54) MANAGING ARTIFACT INFORMATION METHOD AND SYSTEM

(71) Applicant: Siemens Industry Software GmbH, Zürich (CH)

(72) Inventors: Tomas Krajci, Prague (CZ); Jakub Stroleny, Prague (CZ); Stepan Roh, Prague (CZ)

(73) Assignee: Siemens Industry Software GmbH, Zurich (CH)

( * ) Notice: Subject to any disclaimer, the term of this patent is extended or adjusted under 35 U.S.C. 154(b) by 0 days.

(21) Appl. No.: 18/032,600

(22) PCT Filed: Sep. 28, 2021

(86) PCT No.: PCT/EP2021/076637
§ 371 (c)(1),
(2) Date: Apr. 19, 2023

(87) PCT Pub. No.: WO2022/083987
PCT Pub. Date: Apr. 28, 2022

(65) Prior Publication Data
US 2023/0409596 A1 Dec. 21, 2023

(30) Foreign Application Priority Data
Oct. 19, 2020 (EP) .................................. 20202577

(51) Int. Cl.
*G06F 16/20* (2019.01)
*G06F 16/27* (2019.01)
(52) U.S. Cl.
CPC .................................. *G06F 16/27* (2019.01)

(58) Field of Classification Search
CPC ....................................................... G06F 16/27
See application file for complete search history.

(56) References Cited

U.S. PATENT DOCUMENTS

2011/0307862 A1* 12/2011 Abrams .................... G06F 8/71
717/120
2014/0173561 A1 6/2014 Toub
(Continued)

OTHER PUBLICATIONS

PCT International Search Report and Written Opinion of International Searching Authority mailed Dec. 6, 2021 corresponding to PCT International Application No. PCT/EP2021/076637.

*Primary Examiner* — Kristopher Andersen
(74) *Attorney, Agent, or Firm* — Lempia Summerfield Katz LLC

(57) ABSTRACT

A computer-implemented method of managing artefact information and a computer system arranged and configured to execute the steps of the computer-implemented method are provided, wherein at least one internal sequence of artifact information is stored in an internal data store; wherein at least one external sequence of artifact information is stored in a respective external data repository, and wherein the respective internal sequence relates to the respective external sequence. The computer-implemented method includes: importing metadata relating to the respective external sequence from the respective external data repository to a data storage platform; importing the metadata relating to the respective external sequence from the data storage platform to the internal data store; and introducing a link into the respective internal sequence, wherein the link is based on the metadata and links the respective internal sequence with the respective external sequence.

15 Claims, 7 Drawing Sheets

(56) References Cited

U.S. PATENT DOCUMENTS

2016/0011865 A1 1/2016 Apte et al.
2018/0089066 A1* 3/2018 Barnett ............... G06F 11/3688

* cited by examiner

MANAGING ARTIFACT INFORMATION METHOD AND SYSTEM

CROSS REFERENCE TO RELATED APPLICATIONS

This application is a continuation under 37 C.F.R. § 1.53(b) of PCT PCT/EP2021/076637 filed on Sep. 28, 2021, which is hereby incorporated in its entirety by reference. This patent document also claims the benefit of EP20202577.1 filed on Oct. 19, 2020, which is also hereby incorporated in its entirety by reference.

FIELD

The present disclosure is directed, in general, to product lifecycle management (PLM) systems, application lifecycle management (ALM) systems, for example for software, artifact information systems and similar systems, that are used to create, use, and manage data for products including software and artifacts and other items (collectively referred to herein as product systems).

BACKGROUND

Product systems may include stored content associated with products including software and artifacts and other items. Such product systems may benefit from improvements.

BRIEF DESCRIPTION AND SUMMARY

The scope of the present invention is defined solely by the appended claims and is not affected to any degree by the statements within this summary. The present embodiments may obviate one or more of the drawbacks or limitations in the related art.

Variously disclosed embodiments include data processing systems and methods that may be used to facilitate managing artifact information.

According to a first aspect, at least one internal sequence of artifact information is stored in an internal data store, at least one external sequence of artifact information is stored in a respective external data repository, and the respective internal sequence relates to the respective external sequence. A computer-implemented method of managing artifact information may include: causing to import metadata relating to the respective external sequence from the respective external data repository to a data storage platform; importing the metadata relating to the respective external sequence from the data storage platform to the internal data store; and introducing a link into the respective internal sequence. The link is based on the metadata and links the respective internal sequence with the respective external sequence.

According to a second aspect, a computer system may be arranged and configured to execute the steps of this computer-implemented method of managing artifact information. At least one internal sequence of artifact information is stored in an internal data store, at least one external sequence of artifact information is stored in a respective external data repository, and the respective internal sequence relates to the respective external sequence, and the described computer system may be arranged and configured to execute the following steps: causing to import metadata relating to the respective external sequence from the respective external data repository to a data storage platform; importing the metadata relating to the respective external sequence from the data storage platform to the internal data store; and introducing a link into the respective internal sequence, wherein the link is based on the metadata and links the respective internal sequence with the respective external sequence.

According to a third aspect, a computer-readable medium may be encoded with executable instructions, that when executed, cause the described computer system to carry out the described method of managing artifact information. By way of example, the described computer-readable medium may be non-transitory and may further be a software component on a storage device.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the detailed description below, it should be understood that various definitions for certain words and phrases are provided throughout this patent document and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Figure 1:
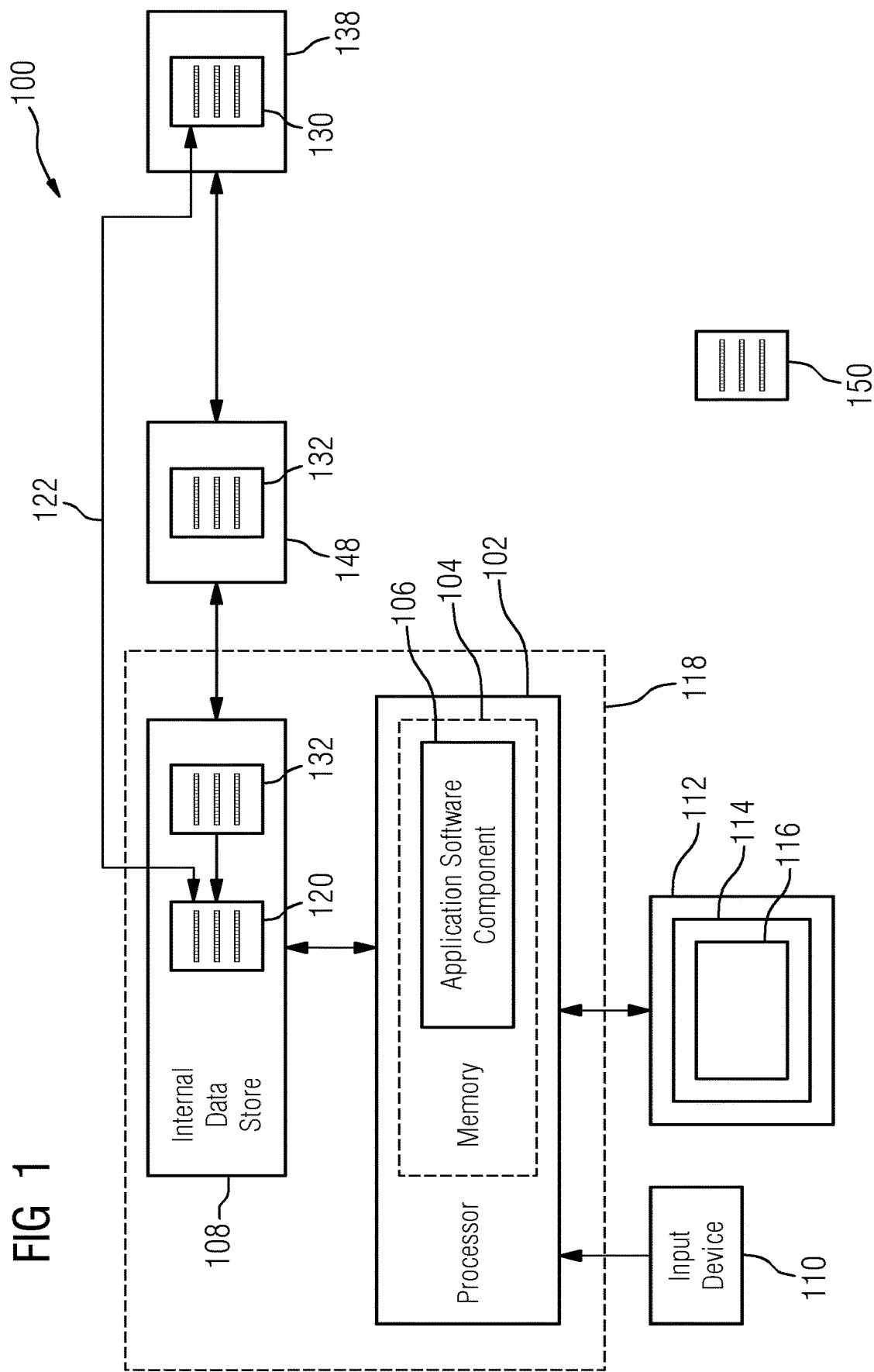
FIGS. 1-5 depict a functional block diagram of an example system that facilitates managing artefact information in a product system according to an embodiment.

Various technologies that pertain to systems and methods for managing artifact information of at least one first artifact document and of at least one second artifact document in a product system are described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

With reference to FIG. 1, a functional block diagram of an example data processing system 118 is depicted that facilitates managing artefact information. The data processing system 118 may, in some examples, be an artifact information management system or more generally a computer system allowing for artifact information management by providing corresponding functionalities to a user. FIG. 1 further illustrates a larger data processing system 100 which includes data processing system 118 and which may also be a computer system.

The processing system 118 may include at least one processor 102 that is configured to execute at least one application software component 106 from a memory 104 accessed by the processor 102. The application software component 106 may be configured (i.e., programmed) to cause the processor 102 to carry out various acts and functions described herein. For example, the described application software component 106 may include and/or correspond to one or more components of PLM or ALM software application that is configured to generate and store product data in a data store 108 such as a database.

Examples of PLM systems that may be adapted to include the merging artifact information features described herein may include the Active Workspace features of Teamcenter, the NX suite of applications, Solid Edge, and/or LMS Imagine.LAB applications, all of which applications are produced by Siemens Industry Software Inc., of Plano, Texas, USA. Examples of ALM systems that may be adapted to include the merging artifact information features described herein may include Polarion ALM, an application produced by Siemens Industry Software GmbH, of Zurich, Switzerland. However, the systems and methods described herein may be used in other product systems (e.g., PLM, PDM, ALM systems) and/or any other type of system that generates and stores product data in a database. Also, examples of databases that may be used as one or more data stores described herein include database server applications such as Oracle, Microsoft SQL Server, or any other type of data store that is operative to store data records.

It should be appreciated that it may be difficult and time-consuming to manage artifact information (e.g., data records representing/storing data corresponding to parts, tools, documents, process descriptions, templates, materials, requirements specifications, software products, software applications) in complex, production PLM or ALM environments. For example, artifact information may be spread in several, if not many external repositories and being able to access the latest version of this scattered artifact information from one central artifact information may cause severe connectivity issues and hence be a long and not efficient process.

To enable the management of artifact information, wherein at least one internal sequence 120 of artifact information is stored in an internal data store 108, wherein at least one external sequence 130 of artifact information is stored in a respective external data repository 138, and wherein the respective internal sequence 120 relates to the respective external sequence 130, the described processing system 118 or 100 may include at least one input device 110 and at least one display device 112 (such as a display screen). The described processor 102 may be configured to generate a graphical user interface (GUI) 114 through the display device 112. Such a GUI may include GUI elements such as buttons, links, search boxes, lists, text boxes, images, scroll bars) usable by a user to provide inputs through the input device 110 that cause managing artifact information. In some embodiments, the respective external data repository 138 is included in the larger data processing system 100.

In some examples, the artifact information of the respective internal sequence 120 and/or the respective external sequence 130 may include software documentation, software applications, complex data objects, work items, requirements, tasks, change requests, defects or test cases, source code of software products or any combination thereof. The artifact information may e.g., be used in the context of (agile) software development.

In some examples, the respective external sequence 130 may include source code, images, videos, text, webpages, documentation, or any combination thereof, etc., by way of example, of software products.

In some examples, the respective external sequence 130 includes a commit or a revision relating to a software being developed. Herein, commit may be understood as a change in source code which is committed and pushed in a GitHub repository offered by GitHub, Inc. of San Francisco, CA, USA which provides hosting for software development and version control using Git. It offers the distributed version control and source code management (SCM) functionality of Git. Further, revision may be understood as a change in source code which is committed and pushed in an Apache Subversion repository (often abbreviated SVN) offered by Apache Software Foundation which is a software versioning and revision control system distributed as open source under the Apache License. Software developers may use Subversion to maintain current and historical versions of files such as source code, web pages, and documentation.

Hence, the respective external sequence 130 may include information on (all) changes made to an older version of the software under development to obtain the currently committed and pushed version. The respective external sequence 130 may also include the author of the change and/or the moment of the change, i.e. who made the change and when the change was made. By way of example, the respective external sequence 130 may be such a commit or revision. Hence, the metadata 132 may be the metadata of such a commit or revision, and the link 122 may directly link to such a commit or revision.

By way of example, the data processing system 118 and/or the application software component 106 allow for artifact information management by providing corresponding functionalities to a user. The corresponding internal sequence 120 that is stored in the internal data store 108 may relate to one, several or many external sequences 130 that is stored in one, several or many external data repositories 138. By way of example, the respective external data repository 138 is accessible for the internal data store 108 and/or the data processing system 118 for data communication by a data connection, e.g. via the internet. Typically, there may be hundreds, thousands or even more of such external data repositories each including one, several or many external sequences 130 that are related to the respective internal sequence 120. Hence, there may be thousands, millions, or even more external sequences 130 that are related to the respective internal sequence 120.

In some examples, the relation between the respective internal sequence 120 and the respective external sequence 130 may include that the respective internal sequence 120 records or in a way keeps track of the respective external sequence 130, e.g., the creation, existence, amendment and/or deletion of the respective external sequence 130. in some examples the creation, existence, amendment and/or deletion of the respective external sequence 130 are described and/or managed in the respective internal sequence 120.

In an example embodiment, the application software component 106 and/or the processor 102 may be configured to cause to import metadata 132 relating to the respective external sequence 130 from the respective external data repository 138 to a data storage platform 148.

By way of example, the metadata 132 may include an electronic address, web address, Uniform Resource Locator (URL), Uniform Resource Identifier (URI), a web page (http), data for file transfer (ftp), database access (JDBC), and/or an IP address of the respective external sequence 130 in the external data repository 138 and/or a some other sort of direct link to directly access the respective external sequence 130 in the external data repository 138, e.g. including from anywhere outside the external data repository 138. The metadata 132 may further include information on the author who created the respective external sequence 130 and/or the creation date of the respective external sequence 130.

By way of example, only one such data storage platform 148 is required for the suggested enhanced artifact information management, although there may be examples in which more than one data storage platform 148 is used. In most examples the number of respective external data repositories 138 is considerably larger than the number of data storage platforms 148, e.g. at least 10, 100 or 1000 times larger. In some embodiments, the data storage platform 148 is included in the larger data processing system 100.

This metadata 132 may, by way of example, be created by the external data repository 138. In some examples, the creation of the metadata 132 may be triggered or caused by the application software component 106 and/or the processor 102 or alternatively an external repository aggregator 140 that is explained in more detail below. In some examples, the data storage platform 148 has a comparably small latency and a comparably large data storage space allowing for fast data transmission and storage of large amounts of data.

The application software component 106 and/or the processor 102 may further be configured to import the metadata 132 relating to the respective external sequence 130 from the data storage platform 148 to the internal data store 108.

The metadata 132 that has previously been imported from the respective external data repository 138 to the data storage platform 148 may then be imported from the data storage platform 148 to the internal data store 108. Hence, the internal data store 108 may have a complete set of metadata with respect to the external sequences 130 relating to the respective internal sequence 120.

For the enhanced management of artifact information, the application software component 106 and/or the processor 102 may further be configured to introduce a link 122 into the respective internal sequence 120, wherein the link 122 is based on the metadata 132 and links the respective internal sequence 120 with the respective external sequence 130.

The metadata 132 may then be used to introduce the link 122 to the respective internal sequence 120. In some examples, the introduction of the link 122 into the respective internal sequence 120 may be achieved by adding the link 122 to the respective internal sequence 120. The link 122 may be used by a user of the internal sequence 120 to directly access the related respective external sequence 130. In most examples, the link 122 may link the respective internal sequence 120 stored in the internal data store 108 with the respective external sequence 130 stored in the respective external data repository 138.

In some embodiments, the application software component 106 and/or the processor 102 may further be configured to cause to import the respective external sequence 130 from the respective external data repository 138 to the data storage platform 148. By way of example, the respective external sequence 130 imported to the data storage platform 148 may include source code and/or the above-mentioned commit or revision of a respective software product stored in the respective external data repository 138. This approach may be useful to accelerated data processing, e.g. if there is a comparably small number of external repositories 138 and/or there are comparably few external sequences 130. In the first special embodiments, the link 122 may link the respective internal sequence 120 stored in the internal data store 108 with the respective external sequence 130 stored in the respective external repository 138. In rare embodiments, the link 122 may alternatively link the respective internal sequence 120 stored in the internal data store 108 with the respective external sequence 130 stored in the data storage platform 148.

The suggested approach facilitates managing artifact information, e.g., by linking the respective internal sequence 120 with the respective (numerous) external sequence(s) 130 in an elegant, reliable, and computationally effortless manner. While other approaches run the risk of causing connectivity issues that may erroneously be identified as denial-of-service attacks or distributed denial-of-service attacks, the suggested approach considerably reduces or entirely eliminates the source of such issues. This may, among others, be achieved by introducing a sort of middleman between the internal data store 108 and the respective (numerous) external data repository(ies) 138 that tremendously reduces or even completely stops the (direct) communication and hence the involved bandwidth between the internal data store 108 and the respective (numerous) external data repository(ies) 138. Rather, the middleman, e.g. the data storage platform 148 or the above-mentioned external expository aggregator 140 may take over a large share if not all the required communication with the respective (numerous) external data repository(ies) 138. This may allow the data processing system 118 and the internal data store 108 to communicate with the data storage platform 148 or the external repository aggregator 140 to get the required metadata 132 of the respective external sequence 130 stored at the respective external data repository 138. This is advantageous because the data storage platform 148 or the external repository aggregator 140 may generally be much easier to communicate with, e.g. since they may have less latency, more bandwidth or are else closer to the data processing system 118 and the internal data store 108 than the respective (numerous) external data repository(ies) 138.

Further, this approach may be beneficial for increasingly many respective external sequences 130 stored at increasingly many respective external data repositories 138 since this approach may scale. E.g., doubling the number of related external sequences 130 and/or of external data repositories 138 becomes a lot less challenging with this approach compared to other approaches involving direct communication between the data processing system 118 and the internal data store 108 and the respective (numerous) external data repository(ies) 138.

In summary, the suggested approach may considerably reduce the strain on the network and hence make the management of artifact information much more reliable and convenient.

The data processing system 118 may be part of a larger data processing system 100 that may include additional elements explained above and below, e.g., the respective external data repository 138, the data storage platform 148 and/or the external repository aggregator 140. By way of example, acts that may be caused by the data processing system 118 may actually be carried out by the data processing system 100, e.g. the respective external data repository 138, the data storage platform 148 and/or the external repository aggregator 140.

Further, a computer-readable medium 150 encoded with executable instructions, that when executed, may cause the data processing system 100, 118 to carry out the described method is depicted in FIG. 1.

In some examples the application software component 106 and/or the processor 102 may further be configured to cause to import the metadata 132 relating to the respective external sequence 130 from the respective external data repository 138 to an external repository aggregator 140 and to cause to import the metadata 132 relating to the respective external sequence 130 from the external repository aggregator 140 to the data storage platform 148.

Hence, the external repository aggregator 140 may be conceived as an intermediary between the respective external repository 138 on the one side and the data storage platform 148 on the other side. The external repository aggregator 140 may pull the data storage platform 148 for information coming from the application software component 106 and/or the processor 102, e.g. a set-up or a configuration of an already connected external repository 138 or of a new external repository 138 yet to be connected. The external repository aggregator 140 may also pull information from the respective external repository 138, including the metadata 132. Further, the external repository aggregator 140 may also carry out a sort of initial fetch, e.g., query information from a new external repository 138 that is yet to be connected. Hence, the external repository aggregator may establish a new connection to a new external repository 138 and then pull, e.g., metadata 138 relating to external sequences 130 stored in the new external repository 138.

In case and external expository aggregator 140 is used, direct communication between the data storage platform 148 and the respective external repository 138 may not be required and hence may not occur.

In certain embodiments, the application software component 106 and/or the processor 102 may be configured to cause to import the respective external sequence 130 from the respective external data repository 138 to the external repository aggregator 140. Embodiments may be suitable for comparably small amounts of external sequences 130 and/or comparably small corresponding external data repositories 138. By way of example, the respective external sequence 130 imported to the external repository aggregator 140 may include source code and/or the above-mentioned commit or revision of a respective software product stored in the respective external data repository 138. The link 122 may still link the respective internal sequence 120 stored in the internal data store 108 with the respective external sequence 130 stored in the respective external repository 138.

The import of the respective external sequence 130 from the respective external data repository 138 to the external repository aggregator 140 may be beneficial to accelerate the data processing in the external repository aggregator 140. Hence, the management of artifact information may become faster and more convenient.

In certain embodiments, the link 122 may alternatively link the respective internal sequence 120 stored in the internal data store 108 with the respective external sequence 130 stored in the external repository aggregator 140.

In some examples, the application software component 106 and/or the processor 102 may further be configured to cause to transform the metadata 132 relating to the respective external sequence 130 into unified metadata 132', wherein the metadata 132 includes the unified metadata 132', and wherein the link 122 is based on the unified metadata 132'.

The respective external sequence 130 may be stored in different kinds of external repositories 138 and/or the above-mentioned external repository aggregator 140 so that different formats of corresponding metadata may occur. The different formats may be challenging and difficult to handle so that transforming the metadata 132 into unified metadata 132' may facilitate the processing and handling of the metadata 132. The transformation of the metadata 132 may be carried out by/in the external repository aggregator 140 (if present) or the data storage platform 148. The unified metadata 132' may then be included in the metadata 132 or even replace the metadata 132. The unified metadata 132' may then be caused to be imported from the external repository aggregator 140 to the data storage platform 148 (if the external repository aggregator 140 is present). The unified metadata 132' may then be imported from the data storage platform 148 to the internal data store 108 or the data processing system 118. The link 122 may then be based on the unified metadata 132', wherein in some examples the original metadata 132 is not used to create the link.

In an embodiment, the application software component 106 and/or the processor 102 may further be configured to cause to import the metadata 132 from the respective external data repository 138 to the data storage platform 148 and/or the external repository aggregator 140 upon creation or change of the respective external sequence 130.

In order to timely get the information of a creation or a change of the respective external sequence 130, a webhook may be used. Such webhooks may, e.g., be "user-defined HTTP callbacks". The webhook may be triggered by some event, such as pushing code to a repository, i.e. creating or changing the respective external sequence 130 in the respective external data repository 138. When that event occurs, the source site may make an HTTP request to the URL configured for the webhook.

Such webhooks or similar approaches that notify the external repository aggregator 140 or the data storage platform 148 that the respective external sequence 130 has been created or amended in the external data repository 138 may be used to trigger the import of the metadata 132 from the respective external data repository 138 to the data storage platform 148 (or according to certain embodiments: to the external repository aggregator 140).

Hence, the external repository aggregator 140 (if present), the data storage platform 148 and hence, eventually, the internal data store 108 and the data processing system 118 may have up-to-date metadata 132 relating to the respective external sequence 130 so that the link 122 may directly link to the most recent respective external sequence 130.

In some examples, the application software component 106 and/or the processor 102 may further be configured to—upon import of the metadata 132 relating to the respective external sequence 130 from the respective external data repository 138 to the data storage platform 148 and/or the external repository aggregator 140—cause to check if metadata 132 relating to a previously created or changed respective external sequence 130 has already been imported from the respective external data repository 138 to the data storage platform 148 and/or the external repository aggregator 140.

Further, the application software component 106 and/or the processor 102 may be configured to cause to import metadata 132 relating to the previously created or changed respective external sequence 130 from the respective external data repository 138 to the data storage platform 148 and/or the external repository aggregator 140, if the metadata 132 relating to the previously created or changed respective external sequence 130 has not yet been imported from the respective external data repository 138 to the data storage platform 148 and/or the external repository aggregator 140.

Since network issues may occur and since the respective external data repository 138 may not always be fully available, it may happen that some updates of external sequences 138 in the respective external data repository 138 may be missed. In order to overcome this difficulty, a check may be made whether metadata 138 relating to a previously created or changed respective external sequence 130 has already been imported from the respective external data repository 138 to the data storage platform 148 and/or the external repository aggregator 140. This check may, e.g., be done when new metadata is imported to make sure that intermediate metadata relating to an external sequence 130 that has been created or amended between the last metadata import and the current metadata import is not overlooked and missed. If such intermediate metadata is indeed missing in the data storage platform 148 and/or the external repository aggregator 140, it is also imported from the respective external data repository 138 to the data storage platform 148 and/or the external repository aggregator 140.

In some examples, the application software component 106 and/or the processor 102 may further be configured to cause to check the respective external data repository 138 for changes relating to the respective external sequence 130 with a first frequency and to cause to import the metadata 132 relating to the respective external sequence 130 from the respective external data repository 138 to the data storage platform 148 and/or the external repository aggregator 140, if changes relating to the respective external sequence 130 occur.

Checking the respective external data repository 138 for changes relating to the respective external sequence 130 may be done with a first frequency, e.g., every minute, once per several minutes, or once per hour. I.e., the first frequency may, by way of example, be comparable low. Hence, a sort of polling may be implemented, i.e., actively sampling the status of an external device, in this case the respective external data repository 138, by a client program or other software, e.g. as a synchronous activity. The first frequency may also be of the order of once per hour or more time to achieve a so-called "health polling" that may be used to find out whether the respective external data repository 138 is still available and whether all relevant updates and changes in their respective external data repository 138 have been detected. In some examples, the first frequency may be configurable by a user or administrator. In other examples, the first frequency may be adapted automatically depending on activity patterns or most recent activities with respect to the respective external sequence 130 and/or the respective external data repository 138. E.g., if there is very little (or much) activity, the first frequency may be comparably low (or high).

In principle, it is also possible to combine regular polling with a comparably low frequency (e.g., every three minutes or every hour) with health polling with an even lower frequency (e.g. once per two hours) so that two different first frequencies may be applied at the same time. Further, the above-mentioned webhooks or similar approaches that notify the data storage platform 148, and/or the external repository aggregator 140 and eventually the internal data store 108 or the data processing system 118 that the respective external sequence 130 has been created or amended in the external data repository 138 may be combined with regular polling and/or health polling.

It should be appreciated that a comparably low first frequency may be effective to reduce the strain on the network and hence make the management of artifact information much more reliable and convenient. At the same time, e.g., by way of using the above-mentioned webhooks, it is nonetheless possible to ensure to have up-to-date metadata 132 available in the data storage platform 148 and the internal data store 108 and if applicable in the external repository aggregator 140.

If the external repository aggregator 140 is present, the metadata 132 relating to the respective external sequence 130 is imported from the respective external data repository 138 to the external repository aggregator 140. The metadata 132 (or the above-mentioned unified metadata 132') may then be imported from the external repository aggregator 140 to the data storage platform 148, wherein different scenarios may be realized. This import may be done as soon new metadata 132 (unified metadata 132') is present in the external repository aggregator 140 or this import may be done based on a given frequency, e.g., with the above-mentioned first frequency used for regular polling.

In an example embodiment, the application software component 106 and/or the processor 102 may further be configured to check the data storage platform 148 for changes relating to the metadata 132 relating to the respective external sequence 130 with a second frequency and—if changes relating to the metadata 132 occur—to import the metadata 132 relating to the respective external sequence 130 from the data storage platform 148 to the internal data store 108.

The check for corresponding new metadata 132 in the data storage platform 148 and—if applicable—the import of the metadata 132 from the data storage platform 148 to the internal data store 108 may be done with a second frequency. Again, some sort of polling may be implemented for the check and if applicable the import. In some examples, the second frequency may be higher than or equal to the first frequency, even if the first frequency relates to regular polling. Hence checking the data storage platform 148 for corresponding new metadata 132 may be done as often or more frequently, e.g., twice or more as frequently, than checking the respective external data repository 138 for changes relating to the respective external sequence 130.

In other approaches, the internal data store 108 and the data processing system 118 directly communicate with the respective external data repository 138 that may be challenging for the corresponding network linking these entities, for example if there is frequent communication between these entities. However, in the suggested approach, a comparably high second frequency regularly may not be challenging with respect to network capacities and bandwidth since it may only be a one-to-one communication (or in some cases a one to a few communication) to an easily accessible communication partner and not a one-to-many communication as in the other approaches. Herein, the one-to-one communication occurs between the internal data store 108 and the data processing system 118 and the data storage platform 148, whereas the one-to-many communication occurs between the internal data store 108 and the data processing system 118 and the (numerous) external data repositories 138.

By way of example, the second frequency may also be comparably high since the date of the storage platform 148 may have a low latency and a high bandwidth. Hence, the second frequency may, e.g., be of the order of seconds, e.g. once per three or five seconds. For example, the second frequency may be much higher, e.g., three orders of magnitude higher than the first frequency.

In some examples, the second frequency may be configurable by a user or administrator. In other examples, the second frequency may be adapted automatically depending on activity patterns or most recent activities with respect to the metadata 132 relating to the respective external sequence 130 and/or the data storage platform 148. E.g., if there is very little (or much) activity, the second frequency may be comparably low (or high).

In some examples, the respective internal sequence 120 of artifact information includes at least one work item 124 relating to a respective software product that includes the respective external sequence 130, wherein the respective work item 124 includes at least one of a requirement, a task, a defect, a change request, a user story, a test case, or any combination thereof.

The work item 124 may, e.g., include at least one user story relating to requirements, features and/or characteristics of the respective software product, e.g. a software application or program. The respective software product may include the respective external sequence 130 that may include, e.g., source code of the corresponding software product. Hence for the purposes of developing, updating, maintaining, etc. the software product, user stories or other work items 124 may be edited and/or managed using the internal sequence 120. Using the link 122, the user story or other work items 124 may directly be linked with the external sequence 130 that relates to or is part of the software product that is developed, updated, maintained, etc. in line with the user story or other work item 124. In some examples, the work item 124 may be used in the context of (agile) software development. For example, the work item 124 may coincide with the user story such that the work item 124 is the user story.

In some examples, the respective external sequence 130 includes one or more revised respective external sequences 130', and wherein the respective external sequence 130, 130' is included in a respective software product.

Regularly during the development or update of a software product, many intermediate versions may be created before a final version is achieved. The different versions may correspond to the respective external sequence and the one or more revised respective external sequences 130'. The respective external sequence 130, 130' may be included in the respective software product and may include, e.g., source code of the corresponding software product.

By way of example, the revised external sequence 130' may be called "revision", e.g. an initial (set of) file(s) is "revision 1", and "revision 2" (and further revisions) corresponds to the first (and further) change(s) made to the initial (or later) (set of) file(s). In some examples, the revised external sequence 130' may be called "commit" or "revision" as explained above, e.g. a set of tentative changes to the software product that are made permanent.

In an example embodiment, the respective work item 124 relates to the respective external sequence 130 and/or to the one or more revised respective external sequences 130', wherein the link 122 links the respective work item 124 included in the respective internal sequence 120 with the respective external sequence 130 and/or with the one or more revised respective external sequences 130'.

By way of example, the respective work item 124, e.g., a respective user story, may relate to a commit or a revision that have been explained above in more detail. Accordingly, the link 122 may link the respective work item 124, e.g., the respective user story, with the corresponding commit or revision. Hence, a user managing a user story may—from the internal sequence 120 including this work item 124—directly access the external sequence 130 including or being identical to the commit or the revision that corresponds to this user story.

In some examples, the application software component 106 and/or the processor 102 may further be configured to display at least one of the respective external sequence 130, the respective revised external sequence 130', the respective internal sequence 120, the respective work item 124, the link 122, or any combination thereof to a user via a user interface 116.

In some examples, the data storage platform 148 is a cloud-based platform or an on-premise platform, wherein the metadata 132 imported from the respective external data repository 138 to the data storage platform 148 is stored in the data storage platform 148 as persistent data.

By way of example, the data storage platform 148 may involve Apache Kafka that is an open-source stream-processing software platform developed by the Apache Software Foundation. Apache Kafka provides a unified, high-throughput, low-latency platform for handling real-time data feeds. In some examples, Apache Kafka may be closer, have higher throughput, and higher availability than a single external data repository 138 and for example than the totality of external data repositories 138.

The data storage platform 148 may be a cloud-based platform accessible from basically everywhere via the Internet. The data storage platform 148 may, e.g., be hosted by one of the large cloud computing providers including Amazon Web Services, Alibaba, SAP, Google and so on. Alternatively, the data storage platform 148 may be an on-premise platform that may, e.g., involve suitable computation facilities located on the premises of a company managing its artifact information. Hybrid versions or virtual private cloud solutions may also be possible for the data storage platform 148.

In some examples, the metadata 132 may be stored as persistent data in the data storage platform 148, e.g., Apache Kafka. Herein persistence refers to the characteristic of a state that outlives the process that created it. This may be achieved in practice by storing the state as data in computer data storage.

in some examples, the link 122 includes a URL or URI link or a clickable link to a web server.

Herein, URL stands for Uniform Resource Locator and URI for Uniform Resource Identifier. Such links may include an electronic address, web address, a web page (http), data for file transfer (ftp), database access (JDBC), and/or an IP address. By way of example, the link may be a clickable link to a web server.

The described examples may provide an efficient way for users to manage artifact information (e.g., parts, tools, documents, process descriptions, templates, materials, requirements or any other type of product data) by enabling the described enhanced management of artifact information. Thus, the described examples may reduce the total cost of ownership of the application software component, by alleviating or at least minimizing the connectivity issues and by linking the respective internal sequence 120 with the respective (numerous) external sequence(s) 130 in an elegant, reliable and computationally effortless manner. Such efficient PLM or ALM management actions may be leveraged in any industry (e.g., Aerospace & Defense, Automotive & Transportation, Consumer Products & Retail, Electronics & Semiconductor, Energy & Utilities, Industrial Machinery & Heavy Equipment, Marine, or Medical Devices & Pharmaceuticals). Such merge actions may also be applicable to consumer facing artifact information that shall be managed.

Figure 2:
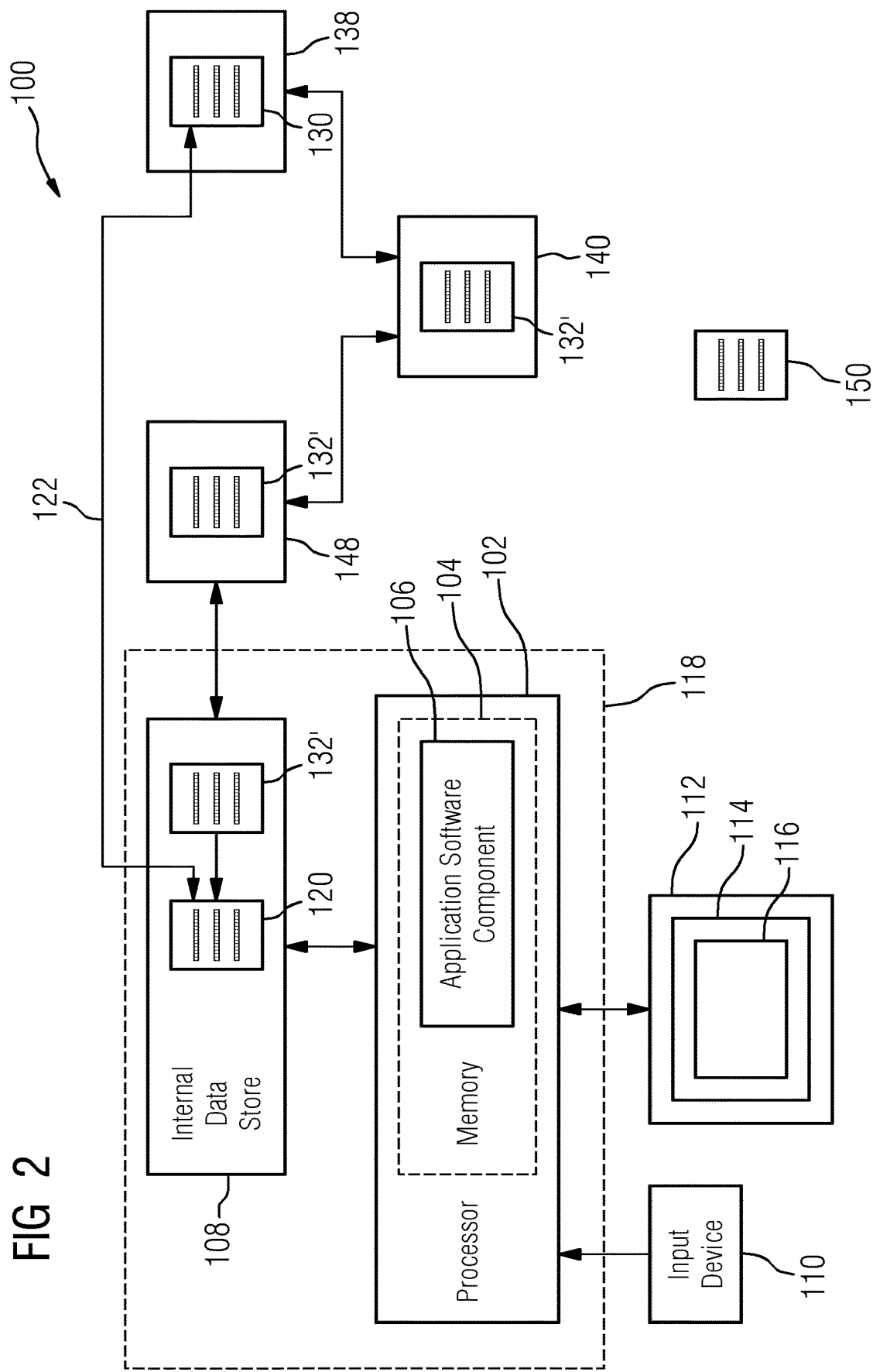

With reference to FIG. 2, a functional block diagram of another example data processing system 118 is depicted that facilitates managing artefact information. Herein, an external repository aggregator 140 is included that communicates with the external data repository 138 and with the data storage platform 148. The metadata 132 relating to the respective external sequence 130 may be imported from the respective external data repository 138 to the external repository aggregator 140. Then, the metadata 132 may be imported from the external repository aggregator 140 to the data storage platform 148.

As indicated in FIG. 2, the metadata 132 relating to the respective external sequence 130 may be transformed by the external repository aggregator 140 into unified metadata 132'. This unified metadata 132' may be included in the metadata 132. In some embodiments, the unified metadata 132' may replace the metadata 132. In the embodiment depicted in FIG. 2, the unified metadata 132' is imported from the external repository aggregator 140 to the data storage platform 148 and then further from the data storage platform 148 to the internal data store 108. The link 122 may then be based on the imported unified metadata 132' and link the internal sequence 120 with the external sequence 130 stored in the external data repository 138.

Figure 3:
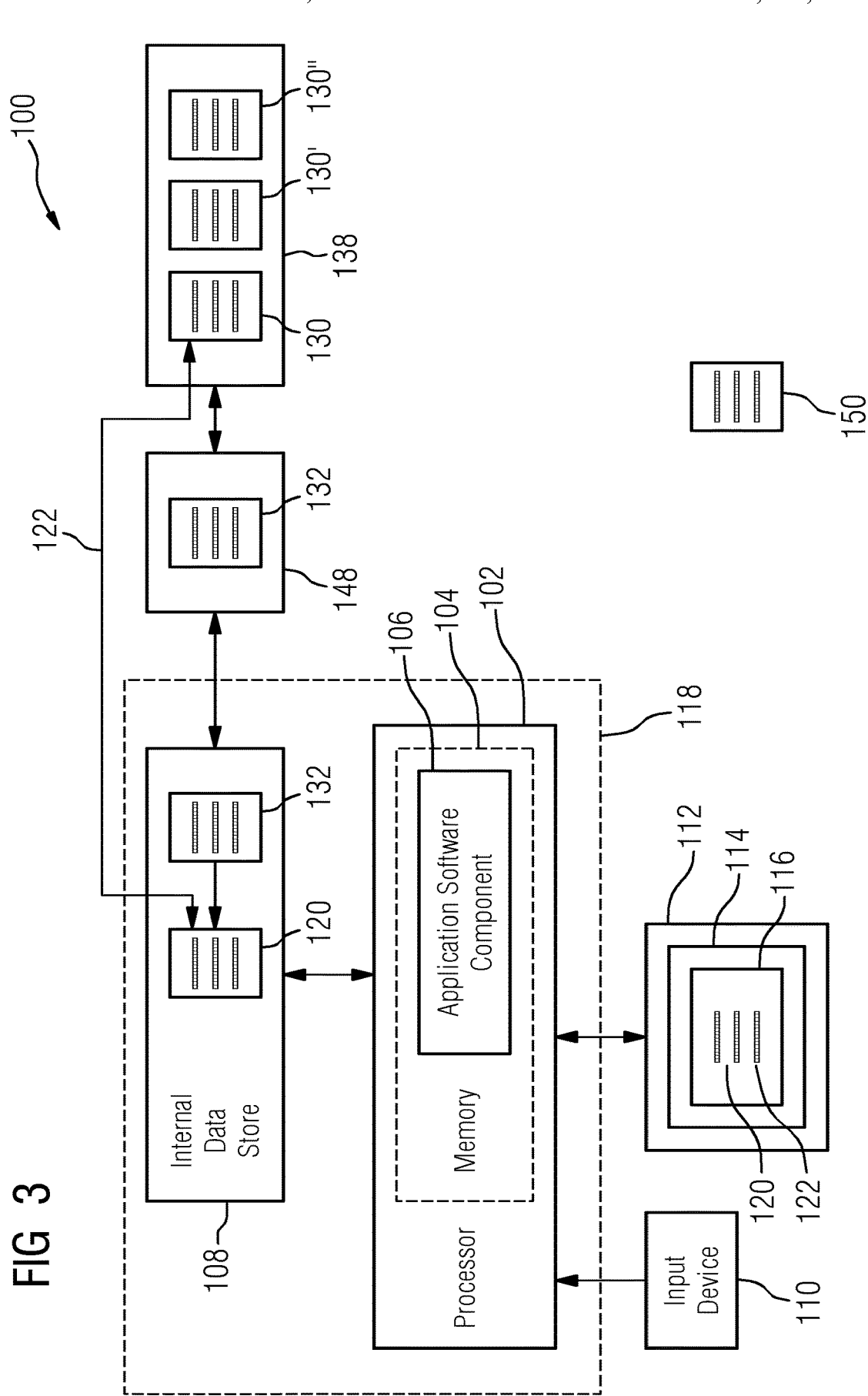

With reference to FIG. 3, a functional block diagram of another example data processing system 118 is depicted that facilitates managing artefact information. Herein, the respective external data repository 138 may include a first revised external sequence 130' and a second revised external sequence 130" that is a revision of first revised external sequence 130'. The metadata 132 imported from the respective external data repository 138 to the data storage platform 148 and then further to the internal data store 108 may include metadata relating to the external sequence 130, the first revised external sequence 130', and the second revised external sequence 130". The link 122 may link the internal sequence 120 with the external sequence 130 (as depicted in FIGS. 1 and 2) and/or optionally with the first revised external sequence 130' and or the second revised external sequence 130".

The internal sequence 120 and the link 122 may be displayed in the user interface 116.

By way of example, the external repository aggregator 140 may be included that communicates with the external data repository 138 and with the data storage platform 148 as described in the context of FIG. 2.

Figure 4:
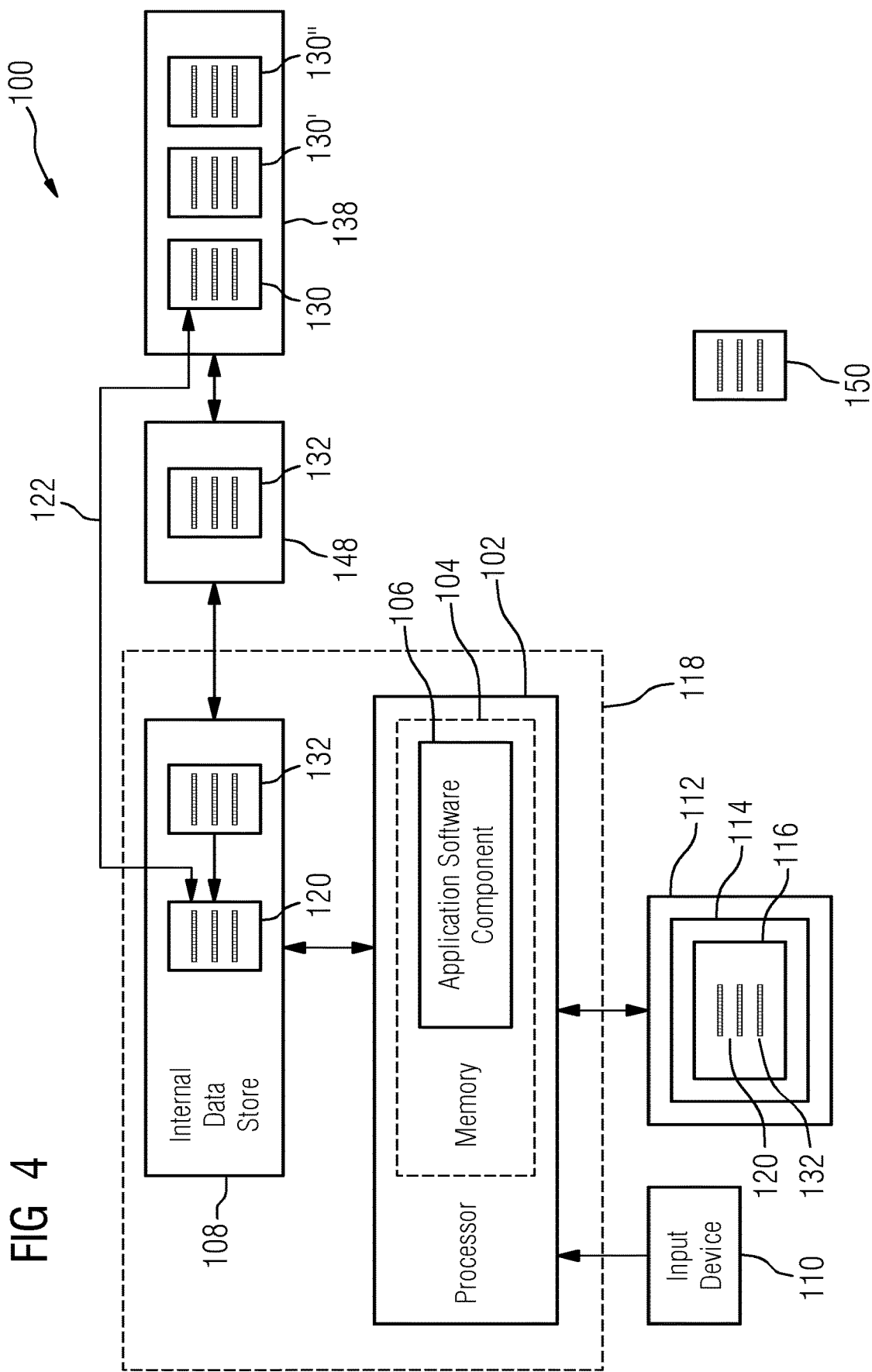

With reference to FIG. 4, a functional block diagram of another example data processing system 118 is depicted that facilitates managing artefact information. Herein, the internal sequence 120 and the metadata 132 may be displayed in the user interface 116.

By way of example, the external repository aggregator 140 may be included that communicates with the external data repository 138 and with the data storage platform 148 as described in the context of FIG. 2.

Figure 5:
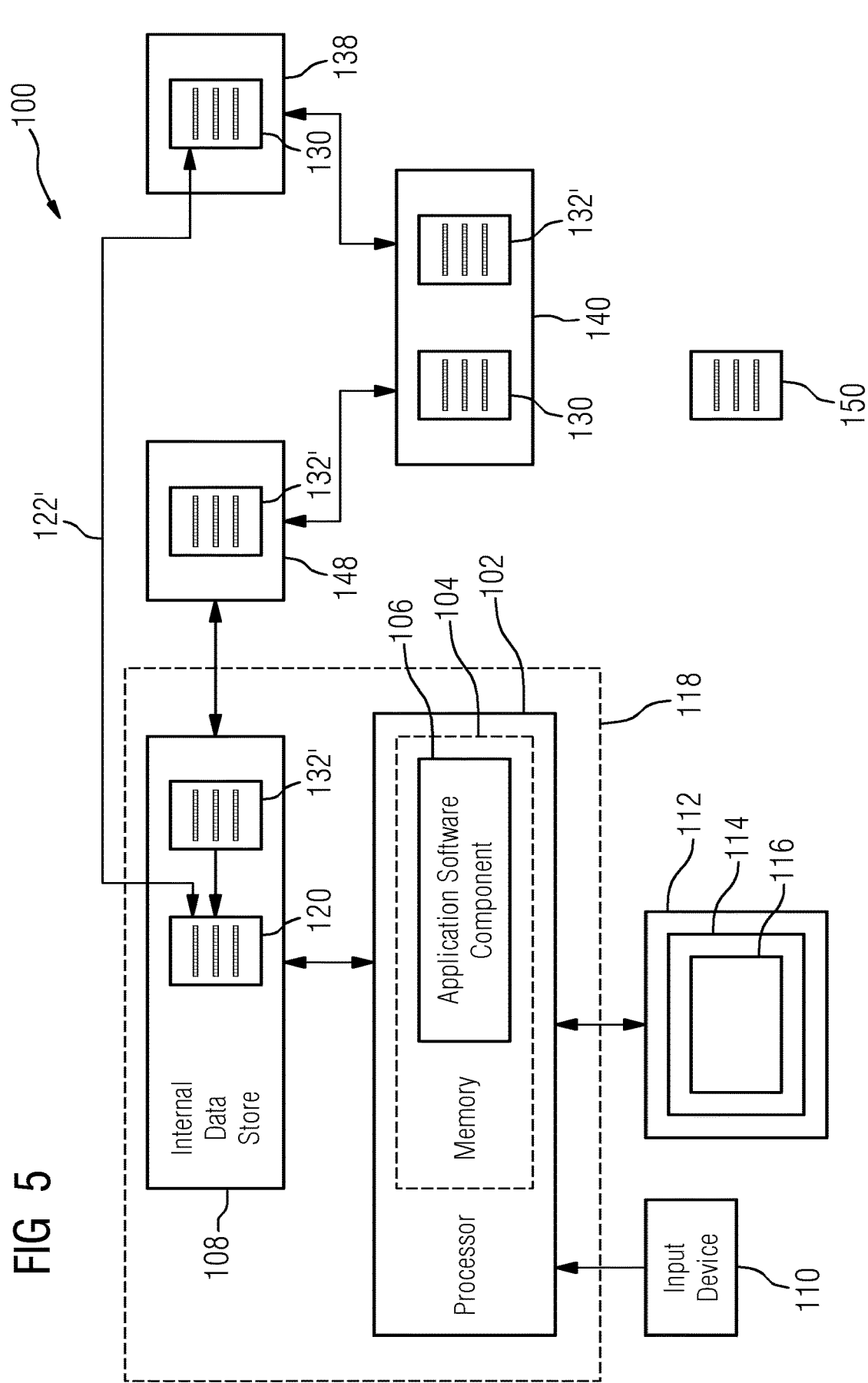

With reference to FIG. 5, a functional block diagram of yet another example data processing system 118 is depicted that facilitates managing artefact information. Herein, the external repository aggregator 140 is included that communicates with the external data repository 138 and with the data storage platform 148 as described in the context of FIG. 2. Further, the external repository aggregator 140 includes the unified metadata 132' of the external sequence 130 and additionally the external sequence 130 that has been imported to the external repository aggregator 140 from the external repository 138. The link 122' links the internal sequence 120 with the external sequence 130 stored in the external data repository 138 based on the unified metadata 132'. Importing the respective external sequence 130 from the respective external repository 138 to the external repository aggregator 140 may contribute to accelerate the data processing in the external repository aggregator 140 and hence make the management of artifact information faster and more convenient. This scenario may correspond to the above-described second special embodiments. In rare embodiments, the link 122' may alternatively link the respective internal sequence 120 stored in the internal data store 108 with the respective external sequence 130 stored in the external repository aggregator 140.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, floppy disks, hard disk drives, SSDs, flash memory, CDs, DVDs, and Blu-ray disks. The computer-executable instructions may include a routine, a sub-routine, programs, applications, modules, libraries, a thread of execution, and/or the like. Still further, results of acts of the methodologies may be stored in a computer-readable medium, displayed on a display device, and/or the like.

Figure 6:
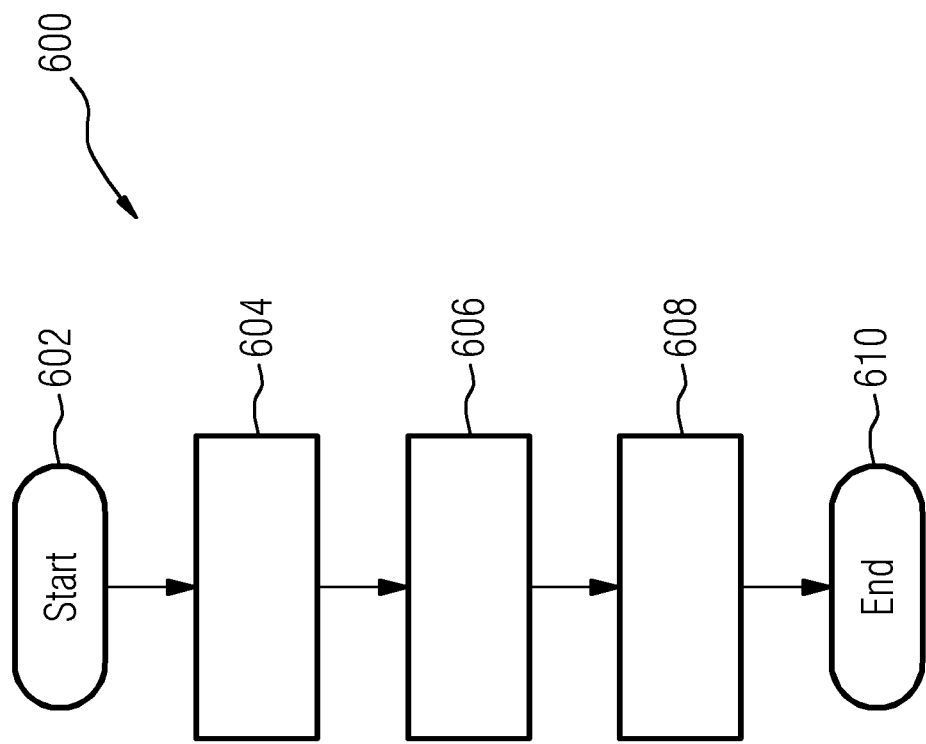
FIG. 6 depicts a flow diagram of an example methodology that facilitates managing artefact information in a product system according to an embodiment.

Referring now to FIG. 6, a methodology 600 that facilitates managing artifact information is depicted, wherein at least one internal sequence 120 of artifact information is stored in an internal data store 108, wherein at least one external sequence 130 of artifact information is stored in a respective external data repository 138, and wherein the respective internal sequence 120 relates to the respective external sequence 130. The method may start at 602 and the methodology may include several acts carried out through operation of at least one processor.

The acts may include an act 604 of causing to import metadata 132 relating to the respective external sequence 130 from the respective external data repository 138 to a data storage platform 148; an act 606 of importing the metadata 132 relating to the respective external sequence 130 from the data storage platform 148 to the internal data store 108; and an act 608 of introducing a link 122 into the respective internal sequence 120, wherein the link 122 is based on the metadata 132 and links the respective internal sequence 120 with the respective external sequence 130. At 610 the methodology may end.

It should be appreciated that the methodology 600 may further include other acts and features discussed previously with respect to the data processing system 118 or 100.

in some examples, the methodology may further include the acts of causing to import the metadata 132 relating to the respective external sequence 130 from the respective external data repository 138 to an external repository aggregator 140; and of importing the metadata 132 relating to the respective external sequence 130 from the external repository aggregator 140 to the data storage platform 148.

In some examples, the methodology may further include the act of causing to transform the metadata 132 relating to the respective external sequence 130 into unified metadata 132', wherein the metadata 132 includes the unified metadata 132', and wherein the link 122 is based on the unified metadata 132'.

For example, the methodology may further include the act of causing to import the metadata 132 from the respective external data repository 138 to the data storage platform 148 and/or the external repository aggregator 140 upon creation or change of the respective external sequence 130.

In some examples, the methodology may further include the acts of—upon import of the metadata 132 relating to the respective external sequence 130 from the respective external data repository 138 to the data storage platform 148 and/or the external repository aggregator 140—causing to check if metadata 132 relating to a previously created or changed respective external sequence 130 has already been imported from the respective external data repository 138 to the data storage platform 148 and/or the external repository aggregator 140 and of causing to import metadata 132 relating to the previously created or changed respective external sequence 130 from the respective external data repository 138 to the data storage platform 148 and/or the external repository aggregator 140, if the metadata 132 relating to the previously created or changed respective external sequence 130 has not yet been imported from the respective external data repository 138 to the data storage platform 148 and/or the external repository aggregator 140.

in some examples, the methodology may further include the acts of causing to check the respective external data repository 138 for changes relating to the respective external sequence 130 with a first frequency and of causing to import the respective external sequence 130 from the respective external data repository 138 to the data storage platform 148 and/or the external repository aggregator 140, if changes relating to the respective external sequence 130 occur.

In some examples, the methodology may further include the acts of checking the data storage platform 148 for changes relating to the metadata 132 relating to the respective external sequence 130 with a second frequency and—if changes relating to the metadata 132 occur—of importing the metadata 132 relating to the respective external sequence 130 from the data storage platform 148 to the internal da-ta store 108 with a second frequency.

Further, in some example embodiments, the methodology may further include the act of displaying at least one of the respective external sequence 130, the respective revised external sequence 130', the respective internal sequence 120, the respective work item 124, the link 122, or any combination thereof to a user via a user interface 116.

As discussed previously, acts associated with these methodologies (other than any described manual acts such as an act of manually making a selection through the input device) may be carried out by one or more processors. Such processor(s) may be included in one or more data processing systems, for example, that execute software components operative to cause these acts to be carried out by the one or more processors. In an example embodiment, such software components may include computer-executable instructions corresponding to a routine, a sub-routine, programs, applications, modules, libraries, a thread of execution, and/or the like. Further, software components may be written in and/or produced by software environments/languages/frameworks such as Java, JavaScript, Python, C, C#, C++ or any other software tool capable of producing components and graphical user interfaces configured to carry out the acts and features described herein.

Figure 7:
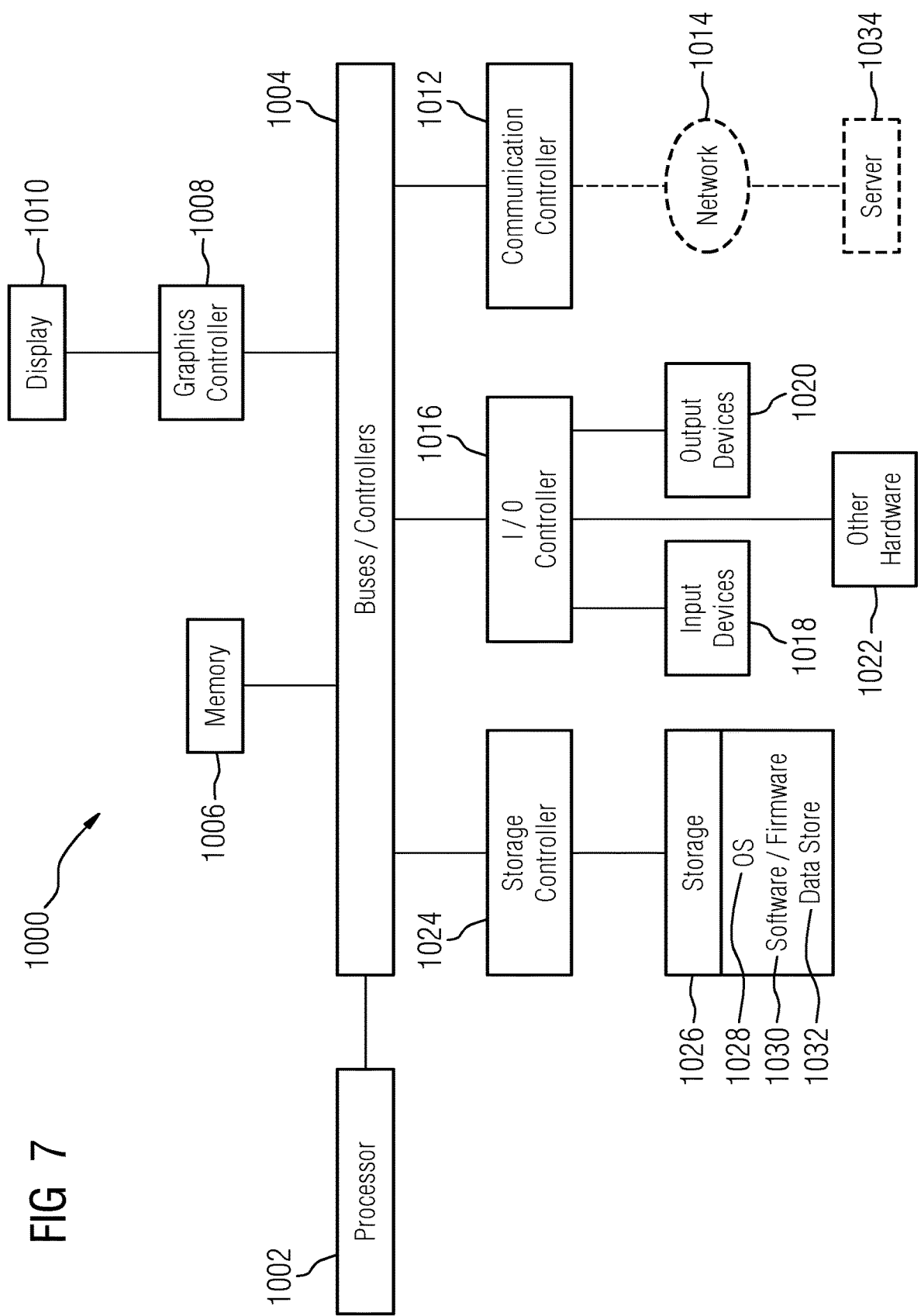
FIG. 7 depicts a block diagram of a data processing system according to an embodiment.

FIG. 7 illustrates a block diagram of a data processing system 1000 (also referred to as a computer system) in which an embodiment may be implemented, for example, as a portion of a product system, and/or other system operatively configured by software or otherwise to perform the processes as described herein. The data processing system depicted includes at least one processor 1002 (e.g., a CPU) that may be connected to one or more bridges/controllers/buses 1004 (e.g., a north bridge, a south bridge). One of the buses 1004, for example, may include one or more I/O buses such as a PCI Express bus. Also connected to various buses in the depicted example may include a main memory 1006 (RAM) and a graphics controller 1008. The graphics controller 1008 may be connected to one or more display devices 1010. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 1012 (Ethernet controllers, WiFi controllers, cellular controllers) operative to connect to a local area network (LAN), Wide Area Network (WAN), a cellular network, and/or other wired or wireless networks 1014 or communication equipment.

Further components connected to various busses may include one or more I/O controllers 1016 such as USB controllers, Bluetooth controllers, and/or dedicated audio controllers (connected to speakers and/or microphones). various peripherals may be connected to the I/O controller(s) (via various ports and connections) including input devices 1018 (e.g., keyboard, mouse, pointer, touch screen, touch pad, drawing tablet, trackball, buttons, keypad, game controller, gamepad, camera, microphone, scanners, motion sensing devices that capture motion gestures), output devices 1020 (e.g., printers, speakers) or any other type of device that is operative to provide inputs to or receive outputs from the data processing system. Also, many devices referred to as input devices or output devices may both provide inputs and receive outputs of communications with the data processing system. For example, the processor 1002 may be integrated into a housing (such as a tablet) that includes a touch screen that serves as both an input and display device. Further, some input devices (such as a laptop) may include a plurality of different types of input devices (e.g., touch screen, touch pad, keyboard). Also, other peripheral hardware 1022 connected to the I/O controllers 1016 may include any type of device, machine, or component that is configured to communicate with a data processing system.

Additional components connected to various busses may include one or more storage controllers 1024 (e.g., SATA). A storage controller may be connected to a storage device 1026 such as one or more storage drives and/or any associated removable media, that may be any suitable non-transitory machine usable or machine-readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also, in some examples, a storage device such as an SSD may be connected directly to an I/O bus 1004 such as a PCI Express bus.

A data processing system in accordance with an embodiment of the present disclosure may include an operating system 1028, software/firmware 1030, and data stores 1032 (that may be stored on a storage device 1026 and/or the memory 1006). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, that is retrievable by a processor.

The communication controllers 1012 may be connected to the network 1014 (not a part of data processing system 1000), that may be any public or private data processing system network or combination of networks, as known to those of skill in the art, including the Internet. Data processing system 1000 may communicate over the network 1014 with one or more other data processing systems such as a server 1034 (also not part of the data processing system 1000). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

In addition, data processing systems may be implemented as virtual machines in a virtual machine architecture or cloud environment. For example, the processor 1002 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 1000 in this example may correspond to a computer, workstation, server, PC, notebook computer, tablet, mobile phone, and/or any other type of apparatus/system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

Also, it should be noted that the processor described herein may be located in a server that is remote from the display and input devices described herein. In such an example, the described display device and input device may be included in a client device that communicates with the server (and/or a virtual machine executing on the server) through a wired or wireless network (that may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In such examples, the processor described herein may correspond to a virtual processor of a virtual machine executing in a physical processor of the server.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, that may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1000 may conform to any of the various current implementations and practices known in the art.

Also, it should be understood that the words or phrases used herein should be construed broadly, unless expressly limited in some examples. For example, the terms "include" and "include," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is executing the software/firmware, that is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may also correspond to a processor circuit particularly fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

In addition, the term "adjacent to" may mean: that an element is relatively near to but not in contact with a further element; or that the element is in contact with the further portion, unless the context clearly indicates otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, that must be included in the claim scope: the scope of patented subject matter is defined only by the allowed claims. Moreover, none of these claims are intended to invoke 35 USC § 112(f) unless the exact words "means for" are followed by a participle.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method of managing artifact information, wherein at least one internal sequence of artifact information is stored in an internal data store; wherein at least one external sequence of artifact information is stored in a respective external data repository, and wherein a respective internal sequence relates to a respective external sequence; the method comprising:
    importing metadata relating to the respective external sequence from a respective external data repository to an external repository aggregator;
    importing the metadata relating to the respective external sequence from the external repository aggregator to a data storage platform;
    importing the metadata relating to the respective external sequence from the data storage platform to the internal data store;
    checking the respective external data repository for changes relating to the respective external sequence with a first frequency;
    checking for changes relating to the metadata relating to the respective external sequence with a second frequency;
    when changes relating to the respective external sequence occur:
        importing the metadata relating to the respective external sequence from the respective external data repository to the data storage platform, the external repository aggregator, or the data storage platform and the external repository aggregator; and
    when changes relating to the metadata occur:
        importing the metadata relating to the respective external sequence from the data storage platform to the internal data store; and
    introducing a link into the respective internal sequence, wherein the link is based on the metadata and links the respective internal sequence stored in the internal data store to the respective external sequence stored in the respective external repository via the data storage platform and the external repository aggregator.

2. The computer-implemented method of claim 1, further comprising:
    transforming the metadata relating to the respective external sequence into unified metadata, wherein the metadata includes the unified metadata, and wherein the link is based on the unified metadata.

3. The computer-implemented method of claim 1, further comprising:
    importing the metadata from the respective external data repository to the data storage platform, the external repository aggregator, or the data storage platform and the external repository aggregator upon creation or change of the respective external sequence.

4. The computer-implemented method of claim 3, further comprising:
    importing the metadata relating to the respective external sequence from the respective external data repository to the data storage platform, the external repository aggregator, or the data storage platform and the external repository aggregator;

checking if metadata relating to a previously created or changed respective external sequence has already been imported from the respective external data repository to the data storage platform, the external repository aggregator, or the data storage platform and the external repository aggregator; and when the metadata relating to the previously created or changed respective external sequence has not yet been imported from the respective external data repository to the data storage platform, the external repository aggregator, or the data storage platform and the external repository aggregator: causing to import metadata relating to the previously created or changed respective external sequence from the respective external data repository to the data storage platform, the external repository aggregator, or the data storage platform and the external repository aggregator.

5. The computer-implemented method of claim 1 wherein the respective internal sequence of artifact information includes at least one work item relating to a respective software product which includes the respective external sequence, wherein the respective work item includes at least one of a requirement, a task, a defect, a change request, a user story, a test case, or any combination thereof.

6. The computer-implemented method of claim 1 wherein the respective external sequence includes one or more revised respective external sequences, and wherein the respective external sequence is included in a respective software product.

7. The computer-implemented method of claim 6 wherein a respective work item relates to the respective external sequence, to the one or more revised respective external sequences, or the respective external sequence and to the one or more revised respective external sequences, and wherein the link links the respective work item included in the respective internal sequence with the respective external sequence [and or with the one or more revised respective external sequences.

8. The computer-implemented method of claim 7, further comprising:

displaying at least one of the respective external sequence, a respective revised external sequence, the respective internal sequence, the respective work item, the link, or any combination thereof to a user via a user interface.

9. The computer-implemented method of claim 1 wherein the data storage platform is a cloud-based platform or an on-premise platform, and wherein the metadata imported from the respective external data repository to the data storage platform is stored in the data storage platform as persistent data.

10. The computer-implemented method of claim 1 wherein the link includes a includes a Uniform Resource Locator (URL) or Uniform Resource Identifier (URI) link or a clickable link to a web server.

11. A computer system comprising:

an internal data store configured to store at least one internal sequence of artifact information; and a processor configured to:

importing metadata relating to a respective external sequence from a respective external data repository to an external repository aggregator;

import the metadata relating to the respective external sequence from the external repository aggregator a data storage platform, wherein respective internal sequences of the internal data store relate to respective external sequences;

import the metadata relating to the respective external sequence from the data storage platform to the internal data store;

check the respective external data repository for changes relating to the respective external sequence with a first frequency;

check for changes relating to the metadata relating to the respective external sequence with a second frequency;

when changes relating to the respective external sequence occur:

import the metadata relating to the respective external sequence from the respective external data repository to the data storage platform, the external repository aggregator, or the data storage platform and the external repository aggregator; and when changes relating to the metadata occur:

import the metadata relating to the respective external sequence from the data storage platform to the internal data store;

and introduce a link into a respective internal sequence, wherein the link is based on the metadata and links the respective internal sequence stored in the internal data store to the respective external sequence stored in the respective external repository via the data storage platform and the external repository aggregator.

12. A non-transitory computer-readable storage medium that stores machine-readable instructions for managing artifact information, wherein at least one internal sequence of artifact information is stored in an internal data store; wherein at least one external sequence of artifact information is stored in a respective external data repository, and wherein a respective internal sequence relates to a respective external sequence, the machine-readable instructions comprising:

importing metadata relating to the respective external sequence from a respective external data repository to an external repository aggregator;

importing the metadata relating to the respective external sequence from the external repository aggregator to a data storage platform;

importing the metadata relating to the respective external sequence from the data storage platform to the internal data store;

checking the respective external data repository for changes relating to the respective external sequence with a first frequency;

checking for changes relating to the metadata relating to the respective external sequence with a second frequency;

when changes relating to the respective external sequence occur:

importing the metadata relating to the respective external sequence from the respective external data repository to the data storage platform, the external repository aggregator, or the data storage platform and the external repository aggregator; and when changes relating to the metadata occur:

importing the metadata relating to the respective external sequence from the data storage platform to the internal data store; and introducing a link into the respective internal sequence, wherein the link is based on the metadata and links the respective internal sequence stored in the internal data store to the respective external sequence stored in the respective external repository via the data storage platform and the external repository aggregator.

13. The non-transitory computer-readable storage medium of claim 12, further comprising:
   transforming the metadata relating to the respective external sequence into unified metadata, wherein the metadata includes the unified metadata, and wherein the link is based on the unified metadata.

14. The non-transitory computer-readable storage medium of claim 12, further comprising:
   importing the metadata from the respective external data repository to the data storage platform, the external repository aggregator, or the data storage platform and the external repository aggregator upon creation or change of the respective external sequence.

15. The non-transitory computer-readable storage medium of claim 14, further comprising:
   importing the metadata relating to the respective external sequence from the respective external data repository to the data storage platform, the external repository aggregator, or the data storage platform and the external repository aggregator:
   checking if metadata relating to a previously created or changed respective external sequence has already been imported from the respective external data repository to the data storage platform, the external repository aggregator, or the data storage platform and the external repository aggregator; and
   when the metadata relating to the previously created or changed respective external sequence has not yet been imported from the respective external data repository to the data storage platform, the external repository aggregator, or the data storage platform and the external repository aggregator: causing to import metadata relating to the previously created or changed respective external sequence from the respective external data repository to the data storage platform, the external repository aggregator, or the data storage platform and the external repository aggregator.

* * * * *